United States Patent
Korenari

(10) Patent No.: US 6,282,043 B1
(45) Date of Patent: Aug. 28, 2001

(54) MAGNETIC REPRODUCTION APPARATUS FOR SUPPRESSING SENSE CURRENT SHUNTING

(75) Inventor: Takahiro Korenari, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/215,336

(22) Filed: Dec. 18, 1998

(30) Foreign Application Priority Data

Dec. 18, 1997 (JP) ..................................................... 9-349135

(51) Int. Cl.$^7$ ................................. G11B 5/03; G11B 5/012

(52) U.S. Cl. ......................... 360/66; 360/97.01; 360/313

(58) Field of Search .......................... 360/66, 313, 97.01; 428/694 T, 692

(56) References Cited

U.S. PATENT DOCUMENTS

| 4,931,892 | * | 6/1990 | Spada | 360/113 |
| 5,652,054 | * | 7/1997 | Kikitsu et al. | 428/328 |

* cited by examiner

*Primary Examiner*—Regina Y. Neal
(74) *Attorney, Agent, or Firm*—Foley & Lardner

(57) ABSTRACT

The present invention provides a magnetic recording apparatus including a magnetic recording medium and a magneto-resistance effect (MR) element opposing to the magnetic recording medium, so that an information recorded on the magnetic recording medium is reproduced via the MR element, wherein if it is assumed that the MR element has a sheet resistance $\rho s$, the magnetic recording medium has a sheet resistance $\rho s'$, and the magnetic recording medium generates a medium magnetic field having a resistance change ratio P, then the values $\rho s$, $\rho s'$, and P are set to satisfy the relationship as follows: $\rho s' > \rho s/P$.

10 Claims, 5 Drawing Sheets

MAGNETIC REPRODUCTION APPARATUS FOR SUPPRESSING SENSE CURRENT SHUNTING

BACKGROUND OF THE INVENTION

1. Field of the Invention

The present invention relates to a magnetic disc apparatus and in particular, to a magnetic recording apparatus having a magneto-resistance effect element opposed to a magnetic recording medium for reading information.

2. Description of the Related Art

A magnetic disc apparatus can employ a magneto-resistance effect type thin film head utilizing the magneto-resistance effect and capable of obtaining a large reproduction output not depending on a velocity relative to a medium. In such a magnetic disc apparatus, rotation of a magnetic disc causes a slider to float above a disc surface and rotation of a carriage moves a reproduction head to a predetermined position on a magnetic disc, so that information can be read from the magnetic disc via the magneto-resistance effect element provided in the reproduction head, That is, when magneto-resistance effect element (hereinafter, referred to as an MR element) is supplied a with a constant sense current and made to face a magnetic disc, resistance of the MR element is changed by a change of magnetic field, i.e., a change of magnetization direction in the magnetic disc (medium). The change of the magnetization direction is converted into a voltage change at both ends of the MR element, so as to obtain a reproduction output voltage corresponding to a resistance change ratio of the MR element, thus enabling reproduction of an information recorded on the magnetic disc according to the reproduction output voltage.

In the aforementioned reproduction method, the distance between the reproduction head and the magnetic disc is made as small as possible, so as to increase the magnetic field that can be sensed by the MR element and increase the reproduction output. This brings about various problems as follows.

That is, in the magnetic disc apparatus, when the MR element or other portion of the head is brought into contact with the magnetic disc and heat is generated by friction, the MR element changes its temperature and its resistance value. In this case, the voltage change cased by a change of the magnetization direction is overlapped with the voltage change caused by the temperature change to determine the reproduction output voltage change.

Moreover, when the MR element is in contact with a magnetic disc, they communicate with each other and the sense current to be supplied to the MR element may be temporarily shunted to the magnetic disc. This changes the voltage at the both ends of the MR element and this change is involved in the change of the reproduction voltage. Accordingly, an abnormal waveform is generated in the reproduction output. This increases the frequency of a reproduction error and may even disable reproduction, deteriorating the reliability of the apparatus.

As has been described above, an abnormal waveform generated when the MR element is brought into contact with the magnetic disc is caused by a temperature change or sense current shunting. The temperature change may be suppressed by making the surface of the magnetic disc more flat and smooth eliminating fine protrusions and the like from the surface, i.e., by mitigating the friction state with the MR element.

However, no effective countermeasure has been suggested to cope with the sense current shunting. For example, the MR element has a protection layer on its surface opposing to the magnetic disc so as to cope with friction. This protection layer also serves as an electrical insulation layer to a certain extent.

However, if the protection layer is too thin or worn out and incapable of obtaining a sufficient insulation effect, the sense current is shunted from the MR element to the magnetic disc, resulting in an abnormal waveform.

SUMMARY OF THE INVENTION

It is therefore an object of the present invention to provide a magnetic reproduction apparatus capable of suppressing the sense current shunting to a magnetic recording medium when the MR element is in contact with the magnetic recording medium, so as to prevent generation of an abnormal waveform in the reproduction output.

The magnetic recording apparatus according to the present invention includes a magnetic recording medium and a magneto-resistance effect (MR) element opposing to the magnetic recording medium, so that an information recorded on the magnetic recording medium is reproduced via the MR element, wherein if it is assumed that the MR element has a sheet resistance $\rho s$, the magnetic recording medium has a sheet resistance $\rho s'$, and the magnetic recording medium generates a medium magnetic field having a resistance change ratio P, then the values $\rho s$, $\rho s'$, and P are set to satisfy the relationship as follows:

$$\rho s' > \rho s/P.$$

In the magnetic reproduction apparatus according to the present invention, the magnetic recording medium has an improved insulation characteristic, so as to suppress shunting of a sense current to the magnetic recording medium when the MR element is brought into contact with the magnetic recording medium. Moreover, because there is no need of providing an insulation layer at the boundary between the MR element and the magnetic recording medium, it is possible to reduce the space between the MR element and the magnetic recording medium by a value equal to the thickness of the insulation layer or the like. This increases the magnetic field that can be detected by the MR element, thus enabling to increase the reproduction output.

Here, if it is assumed that W is a reproduction track width obtained by the MR element; W' is a width equivalent to the reproduction track width W at an arbitrary position on the magnetic recording medium; R is an electrical resistance at both ends of the reproduction track width W of the MR element; and R' is an electrical resistance at both ends of the width W' on the magnetic recording medium, then it is preferable that the R', R, and P be set so as to satisfy a relationship as follows:

$$R' > R/P.$$

Alternatively, instead of the aforementioned, if CR1 is assumed to be a contact resistance between the magnetic film of the magnetic recording medium and the MR element, then it is preferable that the R', R, P, and CR1 be set to values satisfying a relationship as follows:

$$R' > R/P - CR1.$$

This embodiment is effective when an insulation characteristic of a certain degree is present between the MR element and the magnetic recording medium.

Moreover, the magnetic recording medium may include a magnetic film and a protection film layered on the magnetic film, and if the protection film has a sheet resistance $\rho p$, it is preferable that the $\rho p$, $\rho s$, and P be set to satisfy a relationship as follows:

$$\rho p > \rho s / P.$$

In this case, by increasing the insulation characteristic of the protection film, it is possible to suppress shunting of the sense current.

Furthermore, if it is assumed that W is a reproduction track width obtained by the MR element; W" is a width equivalent to the reproduction track width W at an arbitrary position on the protection film; R is an electrical resistance at both ends of the reproduction track width W of the MR element; and R" is an electrical resistance at both ends of the width W" on the protection film, then it is preferable that the R", R, and P be set so as to satisfy a relationship as follows:

$$R'' > R / P.$$

In this case, it is possible to enhance the effect of suppression of the sense current shunting.

Alternatively, instead of the aforementioned, if CR2 is assumed to be a contact resistance between the protection film of the magnetic recording medium and the MR element, then it is preferable that the R", R, P, and CR2 be set to values satisfying a relationship as follows:

$$R'' > R / P - CR2.$$

This embodiment is effective when an insulation effect can be expected between the MR element and the magnetic recording medium except for the protection film.

According to another aspect of the present invention, there is provide a magnetic recording apparatus including a magnetic recording medium and a magneto-resistance effect (MR) element opposing to the magnetic recording medium, so that an information recorded on the magnetic recording medium is reproduced via the MR element, wherein if it is assumed that the MR element has a specific (volume) resistance $\rho v$, the magnetic recording medium has a specific (volume) resistance $\rho v'$, and the magnetic recording medium generates a medium magnetic field having a resistance change ratio P, then the values $\rho v$, $\rho v'$, and P are set to satisfy the relationship as follows:

$$\rho v' > \rho v / P.$$

This configuration also enables to improve the insulation characteristic against the magnetic recording medium so as to suppress the sense current shunting as well as to eliminate the need of an insulation layer or the like at the boundary between the MR element and the magnetic recording medium, which in turn enables to increase the magnetic field that can be detected by the MR element.

In the magnetic reproduction apparatus, if it is assumed that W is a reproduction track width obtained by the MR element; W' is a width equivalent to the reproduction track width W at an arbitrary position on the magnetic recording medium; R is an electrical resistance at both ends of the reproduction track width W of the MR element; and R' is an electrical resistance at both ends of the width W' on the magnetic recording medium, then it is preferable that the R', R, and P be set so as to satisfy a relationship as follows:

$$R' > R / P.$$

This enables to enhance the effect of suppression of the sense current shunting.

Alternatively, instead of the aforementioned, if CR1 is assumed to be a contact resistance between the magnetic film of the magnetic recording medium and the MR element, then it is preferable that the R', R, P, and CR1 be set to values satisfying a relationship as follows:

$$R' > R / P - CR1.$$

This embodiment is effective when an insulation effect other than that of an insulation film can be expected between the MR element and the magnetic recording medium.

BRIEF DESCRIPTION OF THE DRAWINGS

FIG. 4 shows reproduction output waveforms.

FIG. 5 shows reproduction output waveforms.

DESCRIPTION OF THE PREFERRED EMBODIMENTS

Description will now be directed to embodiments of the present invention with reference to the attached drawings.

Figure 1:
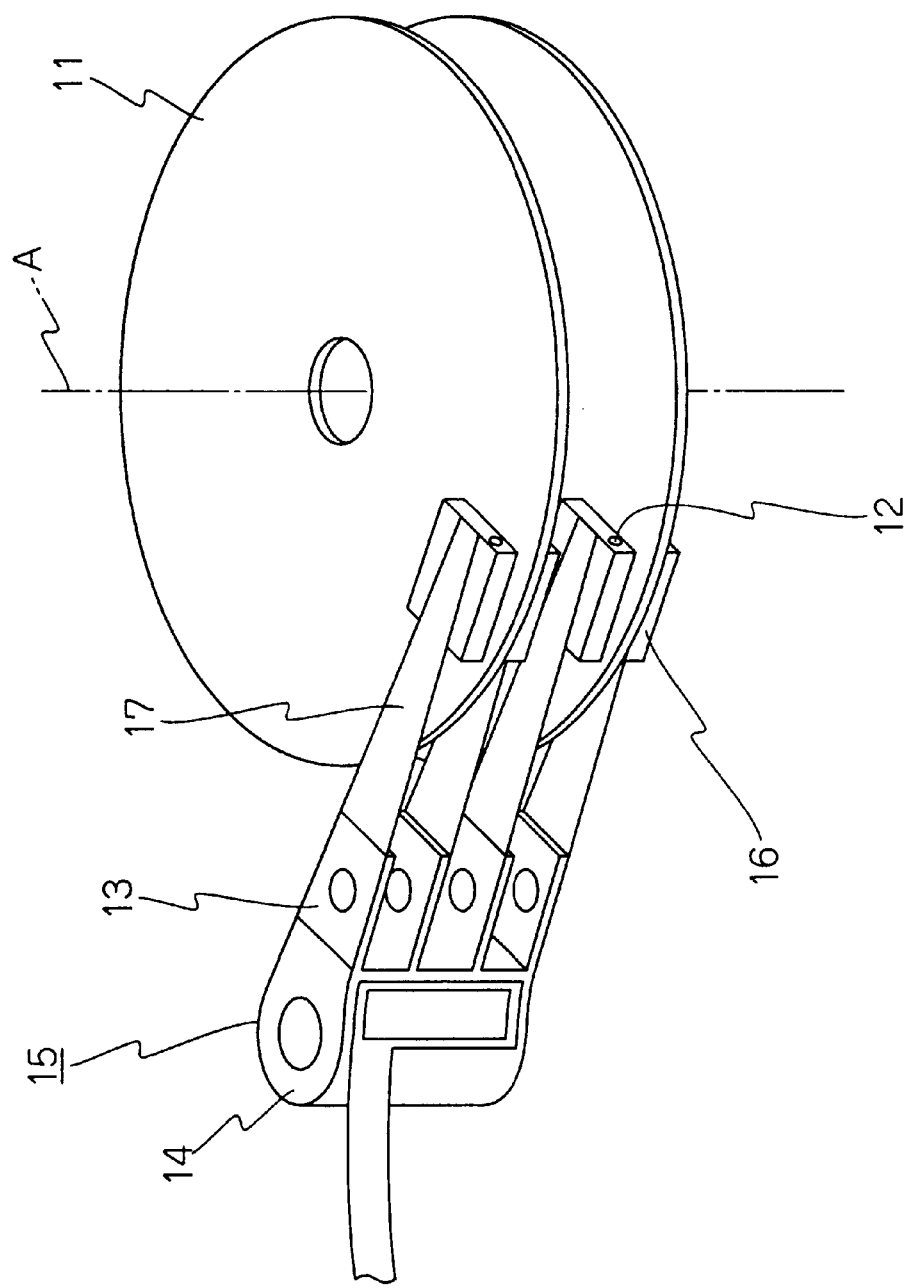
FIG. 1 is a perspective view showing an essential portion of a magnetic disc apparatus according to an embodiment of the present invention.

FIG. 1 is a perspective view showing a magnetic disc apparatus (magnetic reproduction apparatus) according to an embodiment of the present invention. The magnetic disc apparatus of FIG. 1 includes: a magnetic disc (magnetic recording medium) 11 rotatably supported on a shaft A in an apparatus body (not depicted); and a reproduction head 12 moving approximately in a radial direction of the magnetic disc 11 for reading out an information from a recording plane. Furthermore, the magnetic disc apparatus i8 includes: a mounting arm 13 and a carriage 14 constituting an actuator 15; a slider 16 for holding the reproduction head 12; and a suspension 17 fixed at the tip of the mounting arm 13 for supporting the reproduction head 12 and the slider 16.

In the magnetic disc apparatus shown in FIG. 1, when the magnetic disc 11 is rotated, the slider 16 is slightly floated from the surface of the disc and the reproduction head 12 is positioned by rotation of the carriage 14 at a predetermined position on the magnetic disc 11. Thus, it is possible to read via the reproduction head 12 an information from a recording plane of the magnetic disc 11.

Figure 2:
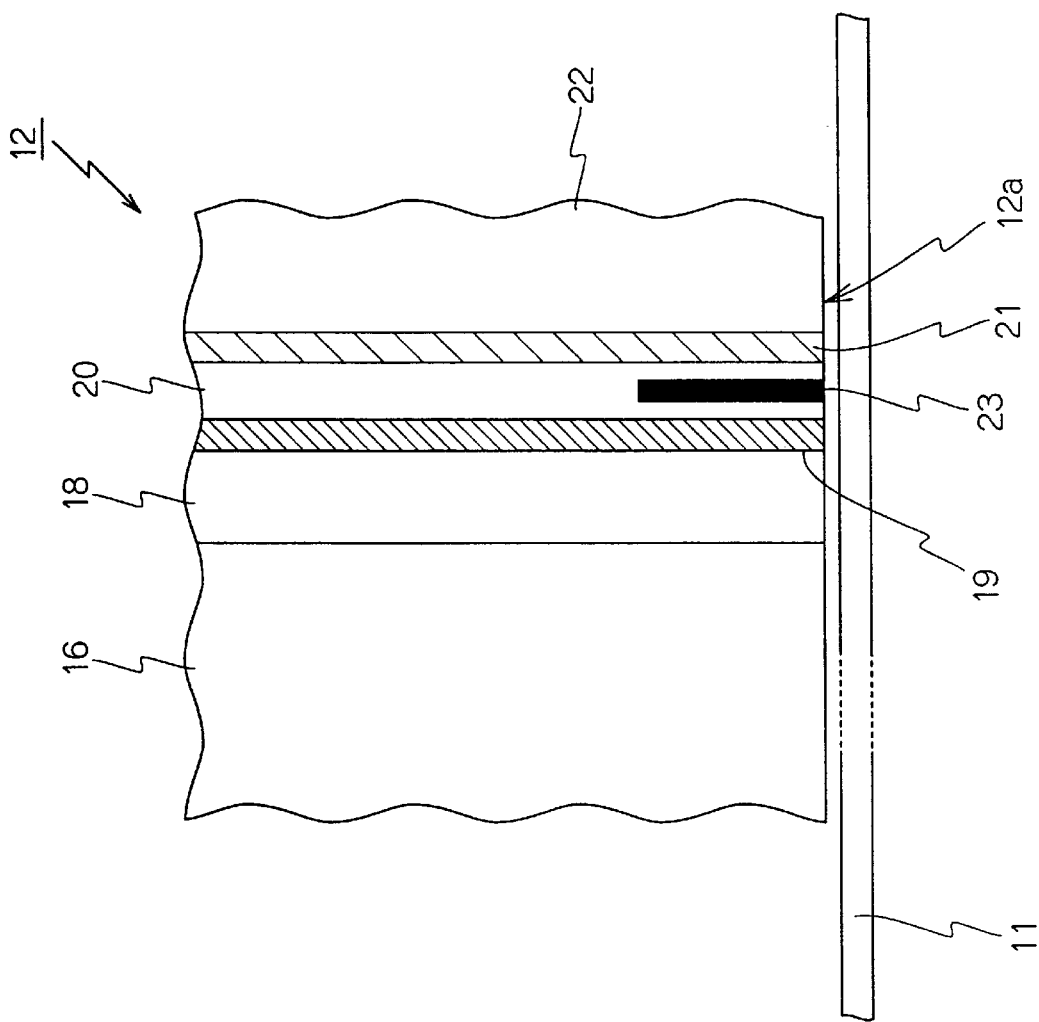
FIG. 2 is a cross sectional view schematically showing an essential portion of a reproduction head in the magnetic disc apparatus of FIG. 1.

FIG. 2 is a cross sectional view schematically showing an essential portion of the reproduction head 12. The reproduction head 12 is formed on the slider 16 by way of the thin film formation process and includes an insulation layer 18, a lower magnetic shield layer 19, an insulation layer 20, an upper magnetic shield layer 21, and an insulation layer 22 in this order when viewed from the slider 16.

A magneto-resistance effect (MR) element 23 is formed between the lower magnetic shield layer 19 and the upper magnetic shield layer 21 so as to be oppose to the magnetic disc 11. The MR element 23 is connected to a lead pattern (not depicted). This lead pattern supplies a sense current to the MR element 23 for outputting a reproduction output voltage to a reproduction block (not depicted) according to a resistance change ratio of the MR element 23.

Figure 3:
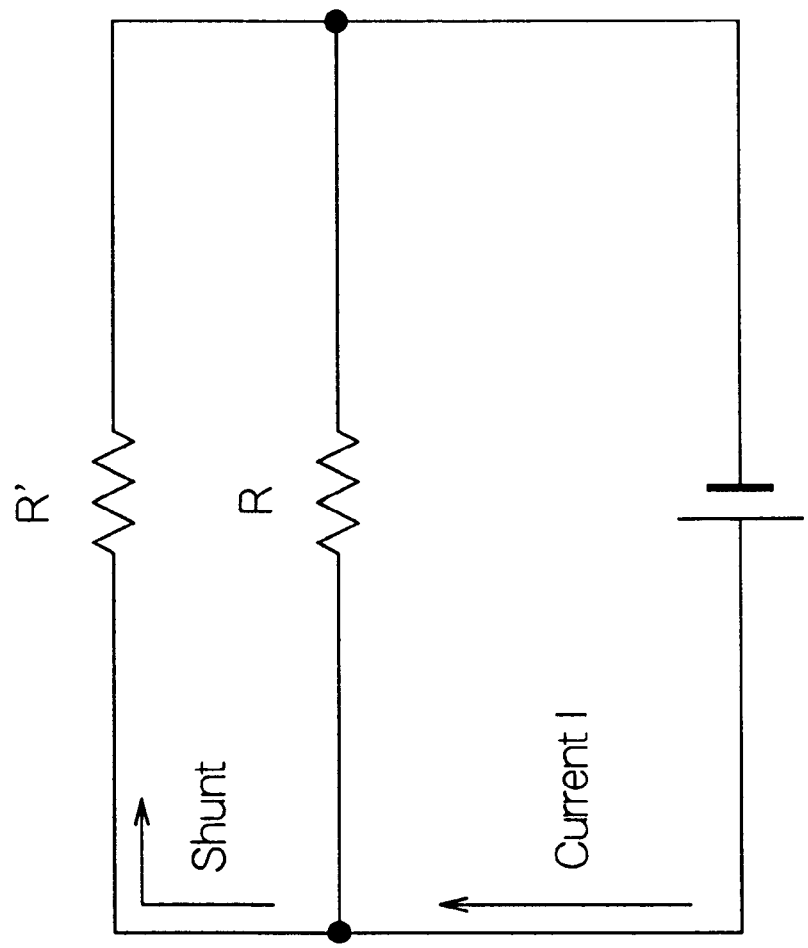
FIG. 3 shows an equivalent circuit diagram for explanation of a sense current shunting.

Here, explanation will be given on the principle for suppressing generation of an abnormal waveform by adjusting the electrical resistance of the MR element 23 and the magnetic disc 11. FIG. 3 is an equivalent circuit for explanation for a sense current shunting. It is assumed that W is a reproduction track width corresponding to the MR element 23; W' is a width equivalent to the reproduction track width W at an arbitrary position on the magnetic disc 11; R is an electrical resistance at both ends of the reproduction track width W of the MR element 23; and R' is an electrical resistance at both ends of the width W' at the arbitrary position on the magnetic disc 11. Here, if the MR element 23 is in a complete contact with the magnetic disc 11, in addition to the electrical resistance R of the MR element 23, the electrical resistance R' is generated as a parallel resistance.

In this case, the sense current supplied to the MR element 23 is reduced by IR/(R+R'). Generation of the additional electrical resistance R' results in the voltage change at both ends of the MR element 23 equal to $IR^2/(R+R')$. This is called a base line fluctuation. If the base line fluctuation is sufficiently small compared to a voltage change (signal amplitude) of the MR element 23 caused by the medium magnetic field, the frequency of the error occurrence during a reproduction is reduced. When a no-signal portion of the magnetic disc 11 is reproduced, no voltage change is to be caused in principle. However, the sense current reduction causes the aforementioned voltage change at the greatest.

That is, when the electrical resistance R of the MR element 23, the resistance change quantity Δ caused by the medium magnetic field, and the sense current I are constant, the problem of the sense current shunting to the magnetic disc 11 can be suppressed by using a magnetic disc 11 having an electrical resistance R' that satisfies the following relationship:

$$I \times \Delta R \gg IR^2/(R+R') \tag{1}$$

This Expression (1) can be rewritten as follows:

$$R' \gg R(R-\Delta R)/66\,R \tag{2}$$

Moreover, considering that the resistance change quantity ΔR is small compared to the electrical resistance R, the Expression (2) can be rewritten as follows:

$$R' \gg R^2/\Delta R \tag{3}$$

Furthermore, by applying the resistance change ratio P (=ΔR/R), the Expression (3) can be rewritten as follows:

$$R' \gg R/P \tag{4}$$

Accordingly, when the magnetic disc 11 has an electrical resistance sufficiently greater than the electrical resistance R of the MR element 23 divided by the resistance change ratio P, it is possible to suppress the problem of sense current shunting to the magnetic disc 11.

The aforementioned relationship can be strictly defined by the ratio F of an allowable base line fluctuation with respect to the signal amplitude as follows:

$$R' > R/(PF) \tag{5}$$

In general, it is sufficient if the base line fluctuation is suppressed to 1/10 of the signal amplitude or below. In this case, the following relationship is satisfied:

$$R' > 10 \times R/P$$

For example, when the electrical resistance R at the both ends of the reproduction track width W is 30 [Ω] and the resistance change ratio P is 0.02, in order to satisfy the condition of R'>R/P and to make the base line fluctuation equal to or below the signal amplitude, it is necessary that the electrical resistance R' at the both ends of the width W' on the magnetic disc 11 be 15 [kΩ] or above. In this case, it is possible to suppress the base line fluctuation due to the sense current shunting to such an extent that no reproduction error is caused.

It is clear from the aforementioned that in order to suppress the sense current shunting, it is preferable that the R' and R be set to values satisfying a following Expression (6).

$$R' > R/P \tag{6}$$

The aforementioned relationship between the electrical resistance of the MR element 23 and that of the magnetic disc 11 can be defined generally using a resistance ratio. That is, if it is assumed that the sheet resistance of the MR element 23 is ρs [W/□], the sheet resistance of the magnetic film of the magnetic disc 11 is ρs' [W/□], and the resistance change ratio due to a medium magnetic field of the magnetic disc 11 is P, then their sheet resistance and resistance change ratio should be set to values satisfying a relationship as follows:

$$\rho s' \gg \rho s/P$$

and satisfying at least a relationship as follows:

$$\rho s' > \rho s/P \tag{7}$$

Similarly, if it is assumed that the MR element 23 has a specific-volume resistance of ρv [Ωcm], and the magnetic disc 11 has a specific-volume resistance of ρv' [Ωcm], their specific-volume resistance and resistance change ratio should be set to values satisfying the following relationship:

$$Rv' \gg \rho v/P$$

and at least satisfying the following relationship:

$$\rho v' > \rho v/P \tag{8}$$

If the above relationship in Expression (7) or Expression (8) is maintained, it is possible to suppress the problem of sense current shunting without providing an insulation layer or the like between the MR element 23 and the magnetic disc 11. That is, it is possible to reduce the space between the MR element 23 and the magnetic disc 11 to be occupied by the thickness of the insulation layer or the like, thus enabling to increase the magnetic field that can be detected by the MR element 23 and to increase the reproduction output.

Moreover, when a non-magnetic protection film is layered on the magnetic film of the MR element 11, in order to more effectively suppress the sense current shunting, the resistance ratio ρp on this protection film is preferably set to a value satisfying the following relationship:

$$\rho p > \rho/P \tag{9}$$

EXAMPLES

Next, explanation will be given on specific examples of the present embodiment.

We prepared an MR element 23 having a sheet resistance ρs of 80 [Ω/□] and a resistance change ratio P of 0.02 and four magnetic discs 11, respectively having a sheet resistance ρs' of 10 [Ω/□], 30 [Ω/□], 50 [Ω/□], and 150 [Ω/□]. The MR element 23 was made to slide over each of the magnetic discs 11. The MR element 23 used for tests had an opposing portion to the magnetic disc 11 that was covered by a diamond-like carbon (DLC) with a thickness of about 10 nm having an insulation effect.

The magnetic disc 11 includes: a Cr film formed on a glass substrate; a CoCr magnetic film having a coercive force of about 2200 [Oe] formed on the Cr film; and a carbon protection film formed with a thickness of about 10 nm on the CoCr magnetic film. Because the MR element 23 had the DLC film, even when the MR element 23 was in complete contact with the magnetic disc 11, there was no complete communication between the MR element 23 and the magnetic disc 11. The electrical resistance of the DLC film in series with the electrical resistance of the magnetic disc 11 was generated as a parallel resistance R' of the MR element 23.

Figure 4A:
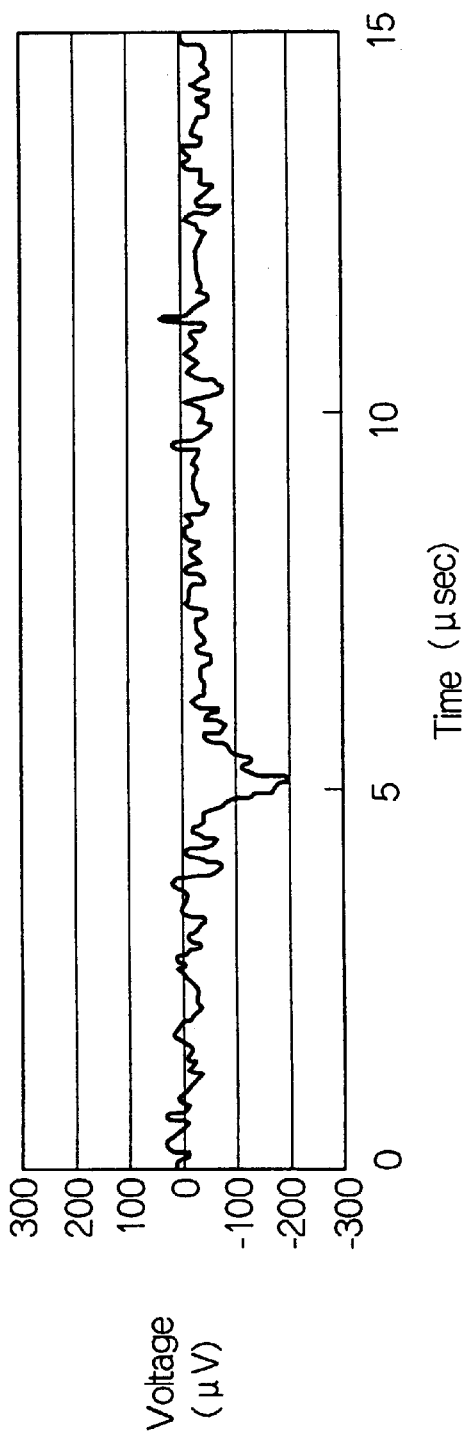
FIG. 4A using a magnetic disc having a sheet resistance (surface resistivity) of 10 $\Omega/\square$ (ohm per square)
Figure 4B:
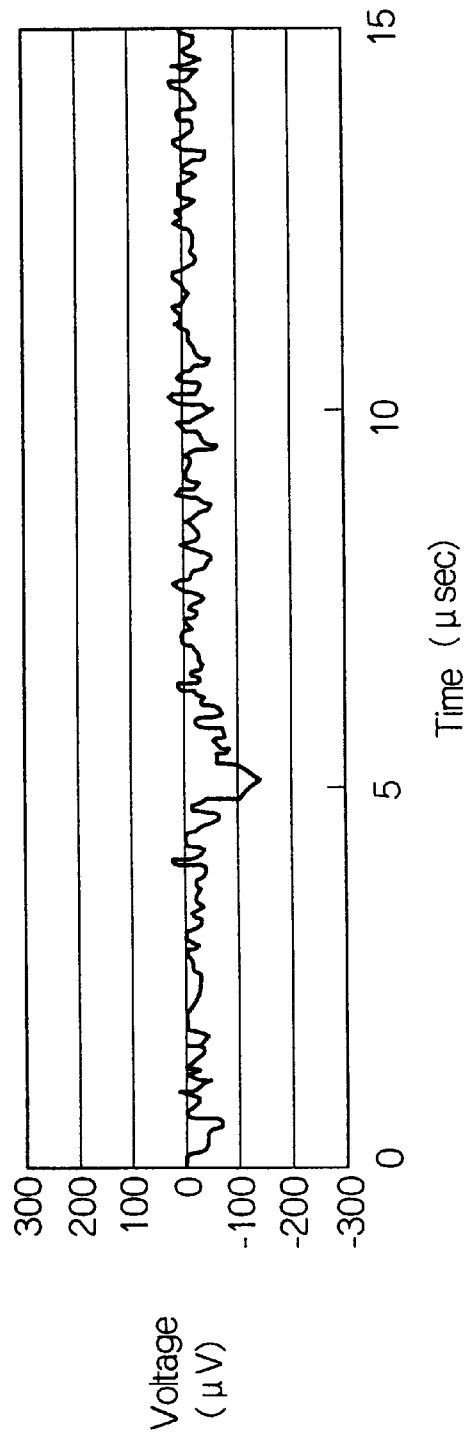
FIG. 4B for a magnetic disc having a sheet resistance (surface resistivity) of 30 $\Omega/\square$ (ohm per square).
Figure 5A:
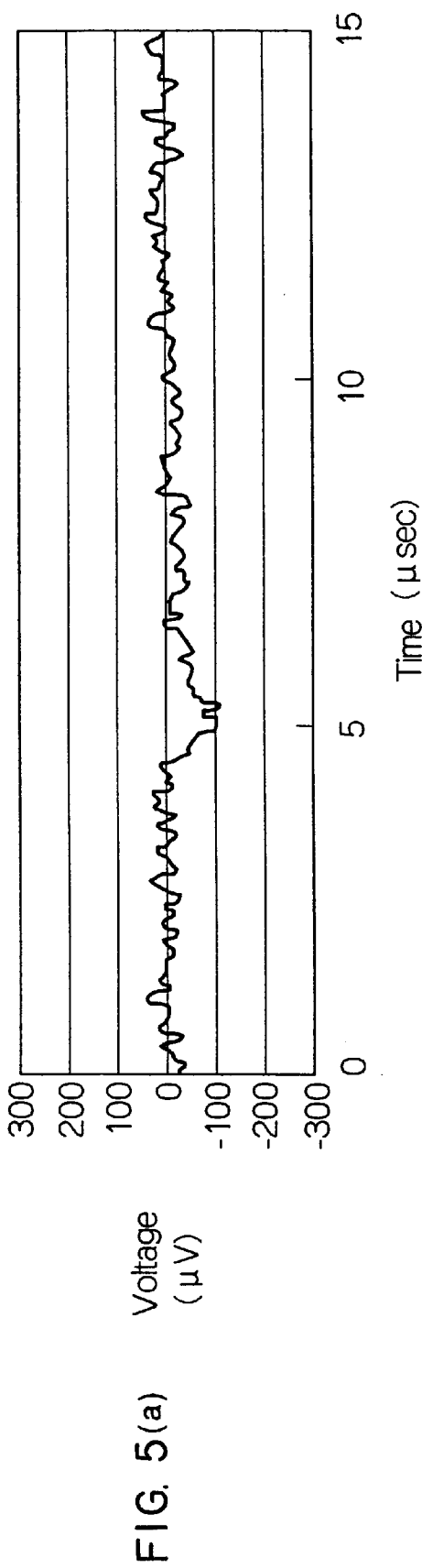
FIG. 5A using a magnetic disc having a sheet resistance (surface resistivity) of 50 $\Omega/\square$ (ohm per square)
Figure 5B:
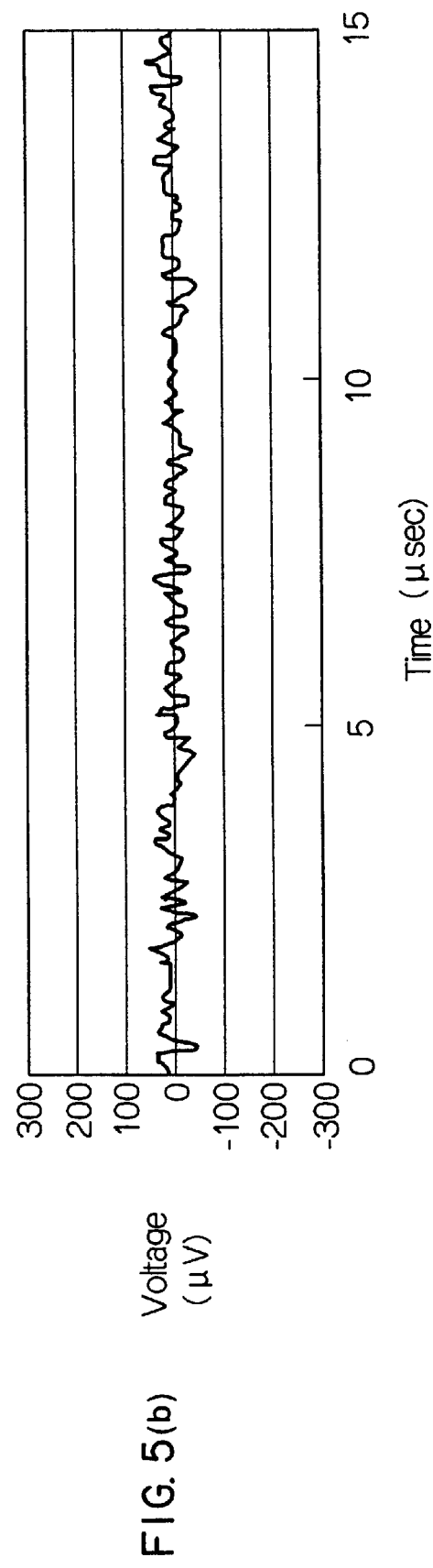
FIG. 5B for a magnetic disc having a sheet resistance (surface resistivity) of 150 $\Omega/\square$ (ohm per square).

FIG. 4 and FIG. 5 show output waveforms reproduced from an erased track of the respective magnetic discs 11. FIG. 4A shows a waveform obtained using the magnetic disc 11 having the sheet resistance of 10 [Ω/□], and FIG. 4B shows a waveform obtained using the magnetic disc 11 having the sheet resistance of 30 [Ω/□]. Moreover, FIG. 5A shows a waveform obtained using the magnetic disc 11 having the sheet resistance of 50 [Ω/□], and FIG. 4B shows a waveform obtained using the magnetic disc 11 having the sheet resistance of 150 [Ω/□].

Measurements were carried out under the condition of: the circumferential velocity of the magnetic disc 11 at about 4.7 m/s and the sense current at about 10 mA. Because a track of a no-signal portion was reproduced, the waveform was to be constant at 0 level without any fluctuation of the base line. However, as shown in FIG. 4A, FIG. 4B, FIG. 5A, and FIG. 5B, remarkable fluctuations of the base line were observed. By comparing these fluctuations of FIG. 4A, FIG. 4B, FIG. 5A, and FIG. 5B, it can be said that the base line fluctuation is reduced as the sheet resistance of the magnetic disc 11 is increased.

Here, if the reproduction output based on the resistance change of the MR element 23 caused by the medium magnetic field is sufficiently greater than the amplitude 200 μV of the base line fluctuation in FIG. 4A for example, there is little chance of generation of a reproduction error due to the fluctuation. However, if the reproduction output is smaller than the amplitude of the base line fluctuation, the frequency of a reproduction error is remarkably increased. Accordingly, when the base line fluctuation has an amplitude of 200 μV, it is preferable that the reproduction output be at least equal to or above 200 μV.

When the opposing portion of the MR element 23 to the magnetic disc 11 is not insulated sufficiently and there is a possibility of communication between the MR element 23 and the magnetic disc 11, the magnetic film of the magnetic disc 11 should have a sheet resistance ρs' set to be greater than the sheet resistance ρs of the MR element 23, 80 [Ω/□] divided by the resistance change ratio P caused by the medium magnetic field.

On the other hand, when an insulation effect of a certain degree can be obtained between the MR element 23 and the magnetic disc 11, it is sufficient that the magnetic disc 11 has the resistance value of the MR element divided by the resistance change ratio and subtracted by the contact resistance between the MR element 23 and the magnetic film (or the protection film), or the specific resistance of the MR element divided by the resistance change ratio caused by the medium magnetic field and subtracted by the contact resistance between the MR element and the magnetic film (or the protection film).

Thus, when an insulation effect of a certain degree can be expected between the MR element 23 and the magnetic disc 11, in order to suppress the sense current shunting, it is preferable that the contact resistance CR1 of the magnetic film of the magnetic disc 11 with the NR element 23 satisfy the relationship of the following Expression (10).

$$R' > R/P - CR1 \tag{10}$$

Moreover, when the insulation of the opposing portion of the MR element 23 to the magnetic disc 11 is insufficient, in order to suppress the sense current shunting, it is preferable that a width W" at an arbitrary position on the protection film equivalent to a reproduction width W and an electrical resistance R" at both ends of the width W" on the protection film satisfy the relationship of the following Expression (11).

$$R'' > R/P \tag{11}$$

Furthermore, when an insulation effect of a certain degree can be expected between the MR element 23 and the magnetic disc 11, in order to suppress the sense current shunting, it is preferable that the contact resistance CR2 between the protection film and the MR element 23 be set to a value satisfying the following relationship.

$$R'' > R/P - CR2 \tag{12}$$

The aforementioned can be interpreted into an expression of electrical resistance as follows. For example, when a sense current of about 10 mA is supplied under the condition that the reproduction track width W is about 1 micrometer and the electrical resistance at both ends of the width W of the MR element 23 is about 20Ω, if a base line fluctuation of about 200 μV is generated, then the reproduction output is preferably at least 200 μV or above. This can be satisfied if the MR element 23 has a resistance change of about 20 mΩ. In this case, the resistance change ratio is about 0.001 and accordingly, an electrical resistance of about 20 kΩ is required at an interval of about 1 micrometer on the magnetic film or protection film at an arbitrary position of the magnetic disc 11.

However, when an insulation film is formed at the opposing portion of the MR element 23 to the magnetic disc 11 and an electrical resistance of about 18 kΩ is present between the MR element 23 and the insulation film surface, it is sufficient that an electrical resistance of about 2 kΩ is present at an interval of about 1 micrometer on the magnetic film or protection film at an arbitrary position of the magnetic disc 11.

As has been explained above, in the magnetic reproduction apparatus according to the present invention, it is possible to suppress the phenomenon of a sense current shunting to a magnetic recording medium when it is brought into contact with the MR element, thus enabling to prevent generation of an abnormal waveform in the reproduction output.

The present invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-349135 (Filed on Dec. 18, 1997) including specification, claims, drawings and summary are incorporated herein by reference in its entirety.

What is claimed is:

1. A magnetic recording apparatus including a magnetic recording medium and a magneto-resistance effect (MR) element opposing to the magnetic recording medium, so that an information recorded on the magnetic recording medium is reproduced via the MR element, wherein if it is assumed that $\rho s$ is the sheet resistance of the MR element, $\rho s'$ is the sheet resistance of the magnetic recording medium, and P is the resistance change ratio caused by the medium magnetic field of the magnetic recording medium, then the values $\rho s$, $\rho s'$, and P are set to satisfy the relationship as follows:

$$\rho s' > \rho s/P.$$

2. A magnetic reproduction apparatus as claimed in claim 1, wherein if it is assumed that W is a reproduction track width obtained by the MR element; W' is a width equivalent to the reproduction track width W at an arbitrary position on the magnetic recording medium; R is an electrical resistance at both ends of the reproduction track width W of the MR element; and R' is an electrical resistance at both ends of the width W' on the magnetic recording medium, then the R', R, and P are set so as to satisfy a relationship as follows:

$$R' > R/P.$$

3. A magnetic reproduction apparatus as claimed in claim 2, wherein if CR1 is assumed to be a contact resistance between the magnetic film of the magnetic recording medium and the MR element, then the R', R, P, and CR1 are set to values satisfying a relationship as follows:

$$R' > R/P - CR1.$$

4. A magnetic reproduction apparatus as claimed in claim 3, wherein if CR2 is assumed to be a contact resistance between the protection film of the magnetic recording medium and the MR element, then the R", R, P, and CR2 are set to values satisfying a relationship as follows:

$$R" > R/P - CR2.$$

5. A magnetic reproduction apparatus as claimed in claim 1, wherein if CR1 is assumed to be a contact resistance between the magnetic film of the magnetic recording medium and the MR element, then the R', R, P, and CR1 are set to values satisfying a relationship as follows:

$$R' > R/P - CR1$$

where, R is an electrical resistance at both ends of the reproduction track width W of the MR element; and R' is an electrical resistance at both ends of the width W' on the magnetic recording medium.

6. A magnetic reproduction apparatus as claimed in claim 1, wherein the magnetic recording medium includes a magnetic film and a protection film layered on the magnetic film, and if the protection film has a sheet resistance $\rho p$, the $\rho p$, $\rho s$, and P are set to satisfy a relationship as follows:

$$\rho p > \rho s/P.$$

7. A magnetic reproduction apparatus as claimed in claim 6, wherein if it is assumed that W is a reproduction track width obtained by the MR element; W" is a width equivalent to the reproduction track width W at an arbitrary position on the protection film; R is an electrical resistance at both ends of the reproduction track width W of the MR element; and R" is an electrical resistance at both ends of the width W" on the protection film, then the R", R, and P are set so as to satisfy a relationship as follows:

$$R" > R/P.$$

8. A magnetic recording apparatus comprising a magnetic recording medium and a magneto-resistance effect (MR) element opposing to the magnetic recording medium, so that an information recorded on the magnetic recording medium is reproduced via the MR element, wherein if it is assumed that the MR element has a specific (volume) resistance $\rho v$, the magnetic recording medium has a specific (volume) resistance $\rho v'$, and the magnetic recording medium generates a medium magnetic field having a resistance change ratio P, then the values $\rho v$, $\rho v'$, and P are set to satisfy the relationship as follows:

$$\rho v' > \rho v/P.$$

9. A magnetic reproduction apparatus as claimed in claim 8, wherein if it is assumed that W is a reproduction track width obtained by the MR element; W' is a width equivalent to the reproduction track width W at an arbitrary position on the magnetic recording medium; R is an electrical resistance at both ends of the reproduction track width W of the MR element; and R' is an electrical resistance at both ends of the width W' on the magnetic recording medium, then the R', R, and P are set so as to satisfy a relationship as follows:

$$R' > R/P.$$

10. A magnetic reproduction apparatus as claimed in claim 8, wherein if CR1 is assumed to be a contact resistance between the magnetic film of the magnetic recording medium and the MR element, then the R', R, P, and CR1 are set to values satisfying a relationship as follows:

$$R' > R/P - CR1.$$

* * * * *